(12) United States Patent
Kurita et al.

(10) Patent No.: US 6,267,443 B1
(45) Date of Patent: Jul. 31, 2001

(54) RECLINING SEAT FOR VEHICLE

(75) Inventors: Masahiro Kurita; Masaharu Hori, both of Mie (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/377,173

(22) Filed: Aug. 19, 1999

(30) Foreign Application Priority Data

Aug. 20, 1998 (JP) .................................................. 10-233965
Aug. 20, 1998 (JP) .................................................. 10-233969
Aug. 20, 1998 (JP) .................................................. 10-234041

(51) Int. Cl.$^7$ ...................................................... B60N 2/02
(52) U.S. Cl. ........................................ 297/374; 297/361.1
(58) Field of Search ................................ 297/361.1, 374, 297/354.12, 362; 192/44, 45, 30 R

(56) References Cited

U.S. PATENT DOCUMENTS

| | | |
|---|---|---|
| 2,560,181 * | 7/1951 | Morvice . |
| 3,216,766 * | 11/1965 | Tabor . |
| 4,070,058 * | 1/1978 | Muehling . |
| 4,408,799 * | 10/1983 | Bowman . |
| 4,700,587 * | 10/1987 | Bianchi et al. . |
| 5,593,210 * | 1/1997 | Schwarzbich . |
| 5,896,973 * | 4/1999 | Hochmuth et al. . |
| 6,032,777 * | 3/2000 | Denis . |

FOREIGN PATENT DOCUMENTS

1011446 * 12/1965 (GB) .

* cited by examiner

*Primary Examiner*—Milton Nelson, Jr.
(74) *Attorney, Agent, or Firm*—Wenderoth, Lind & Ponack, L.L.P.

(57) ABSTRACT

A reclining seat having a backrest adjustable to any desired angle. The backrest is inclinably connected to the rear of the seat cushion. A fixed ring and a rotary ring are provided around an axis about which the backrest pivots. The fixed ring is mounted to the seat cushion and the rotary ring to the backrest. Cam grooves having a V-shaped section are formed in the outer circumferential surface of the fixed ring. Rolling elements are mounted between the cam grooves and a cylindrical inner surface of the rotary ring. With the backrest adjusted to a desired angle, the rolling elements are brought into frictional contact with the cam groove bottoms and the cylindrical surface to lock the backrest. An operating member having a lever is coaxially and rotatably mounted on a cage. By rotating the operating member, the cage is pushed axially by ramps formed on the operating member until protrusions formed on the cage engage in recesses formed in the fixed ring to position the rolling elements in central positions of the cam grooves. In this position, the rolling elements are not in frictional contact with the cylindrical surface, so that the inclination angle of the backrest is adjustable.

13 Claims, 13 Drawing Sheets

RECLINING SEAT FOR VEHICLE

BACKGROUND OF THE INVENTION

This invention relates to a reclining seat for a vehicle such as an automobile.

A manual type reclining seat comprises a buttock-supporting, seat and a backrest reclinably joined to the rear end of the seat. At the joint portion, there are provided a spiral spring for biasing the backrest to its upright position and a locking mechanism for locking the backrest at an adjusted position. A typical locking mechanism is a ratchet mechanism comprising a sector gear mounted on the backrest and a ratchet provided at an end of a control lever and engageable with teeth of the sector gear.

Since the backrest is locked in position by engaging the ratchet with teeth of the gear, its position is adjustable only stepwise, so that it is difficult to recline the backrest precisely to an ideal position at which the user is the least fatigued.

Also, the ratchet often meshes incompletely with a gear tooth. In such a case, the ratchet collides repeatedly against the gear, producing uncomfortable noise.

An object of this invention is to provide a reclining seat having a backrest which can be inclined to any desired position in a stepless manner without producing any awkward noise.

SUMMARY OF THE INVENTION

According to this invention, there is provided a reclining seat wherein a backrest is inclinably coupled to a seat cushion and is biased by an elastic member toward an upright position. A clutch is provided on a central axis about which the backrest pivots, and the clutch comprises a fixed ring mounted to the seat cushion, a rotary ring mounted to the backrest, a locking mechanism for frictionally locking the rotation of the rotary ring relative to the fixed ring by coming into frictional contact therewith, an unlocking mechanism for unlocking the locking mechanism, and a control mechanism for controlling the unlocking mechanism.

Here, the fixed ring may be one having a greater diameter than the rotary ring, or may be one having a smaller diameter.

With this arrangement, when the locking by the locking mechanism is released by controlling the unlocking mechanism through the control mechanism, the backrest is moved to an upright position under the resilient force of the resilient member. Also, by leaning the upper torso against the backrest, the backrest is inclined rearwardly. It is thus possible to adjust the inclination of the backrest to a desired degree. After the inclination adjustment, when the control mechanism is released and the weight is leaned against the backrest, the locking mechanism is activated the backrest is thus locked at the inclination adjusted position.

Since clutches are provided on both sides of the coupling portion of the seat cushion and the backrest, even if there is an uneven distribution of the load on the backrest, twisting of the backrest is prevented.

The locking mechanism may comprise cam grooves formed in the fixed ring on a circumferential surface thereof and which are the deepest at the circumferentially central portion thereof and gradually shallower toward both circumferential ends, a cylindrical surface formed on the rotary ring opposite the fixed ring, rolling elements received in the cam grooves such that when the rolling elements are in their neutral positions, i.e. positions at the circumferential center of each cam groove, a small radial gap is present between each rolling element and the cam groove, a cage mounted between the fixed ring and the rotary ring for retaining the rolling elements, and a friction mechanism provided between the cage and the rotary ring for transmitting the rotation of the rotary ring to the cage.

With such a locking mechanism, when the rotary ring tends to rotate relative to the fixed ring, the rolling elements come into frictional contact with the cam groove bottoms and the cylindrical surface, thus preventing rotation of the rotary ring in normal and reverse directions.

The locking mechanism may comprise arcuate cutouts formed on a small-diameter one of the opposed circumferential surfaces of the fixed and rotary rings, sprags each circumferentially pivotable about one of the cutouts, and adapted to come into frictional contact with the large-diameter circumferential surface when pivoted, a cage for retaining the sprags, and a friction mechanism provided between the cage and the rotary ring for transmitting the rotation of the rotary wing to the cage.

With this locking mechanism, when the rotary ring tends to rotate relative to the fixed ring, the sprags are inclined by the cage adapted to rotate together with the rotary ring, and brought into frictional engagement with the cylindrical surface, so that the rotary ring is locked. The backrest is thus retained in the inclination adjusted position.

The unlocking mechanism may comprise positioning recesses formed in one of opposed surfaces between the cage and the fixed ring, and positioning protrusions formed on the other of the opposed surfaces and each received in one of the positioning recesses with a clearing present in the rotating direction, the positioning protrusions being movable to engaged positions wherein the clearance disappear to position the cage relative to the fixed ring, thereby keeping the rolling elements in neutral positions at the circumferential center of each cam groove.

The operating device may comprise an operating member having a lever and provided axially opposite the cage so as to be rotatable relative to the cage, and cam device between the control member and the cage for pressing the cage when the control member rotates, thereby engaging the positioning protrusions in the positioning recesses.

In such unlocking mechanism and control mechanism, when the cage is pressed by rotating the control member through the operation of the lever, the positioning protrusions engage in the positioning recesses. By this engagement, the cage is positioned, so that the rolling elements or the sprags are held in the neutral position in which radial gaps are formed between them and the cylindrical surface. Thus, the rotary ring is now rotatable in both directions, so that the inclination of the backrest is adjustable.

Here, by providing the rotary ring with a frictional resistance imparting device, the means can absorb shaky motion of the backrest in the rotational direction. Thus, it is possible to obtain a reclining seat which is high in stability and comfortable.

Also, by using a spiral spring as an elastic member for imparting resilience to the backrest in the erecting direction, and by mounting the spiral spring in one of the fixed ring and the rotary ring that is smaller in diameter than the other, it is possible to reduce the size of the inclination adjusting mechanism. This improves freedom of design of the car body structure, and also improves livability of the car interior.

Other features and objects of the present invention will become apparent from the following description made with reference to the accompanying drawings, in which:

DETAILED DESCRIPTION OF THE INVENTION

Embodiments of this invention are described with reference to the drawings.

Figure 1:
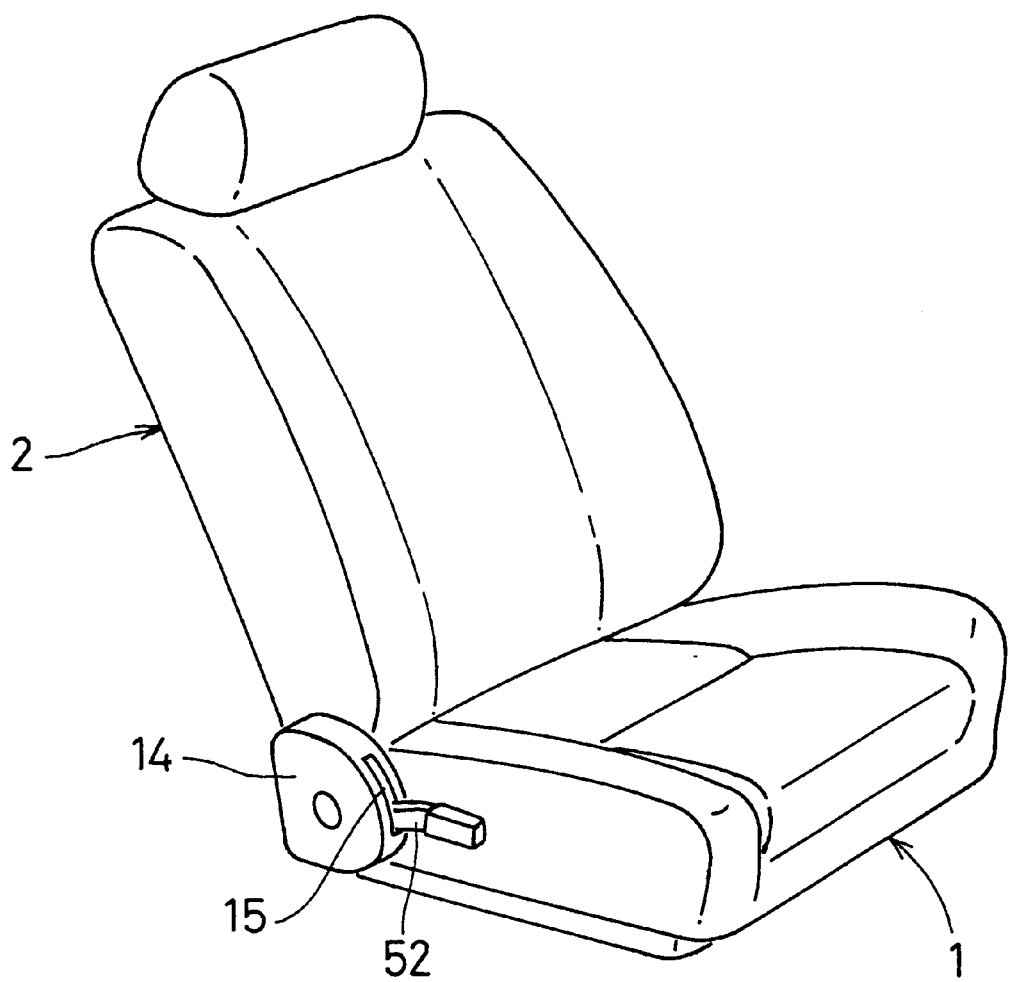
FIG. 1 is a perspective view of a reclining seat embodying this invention.
Figure 2:
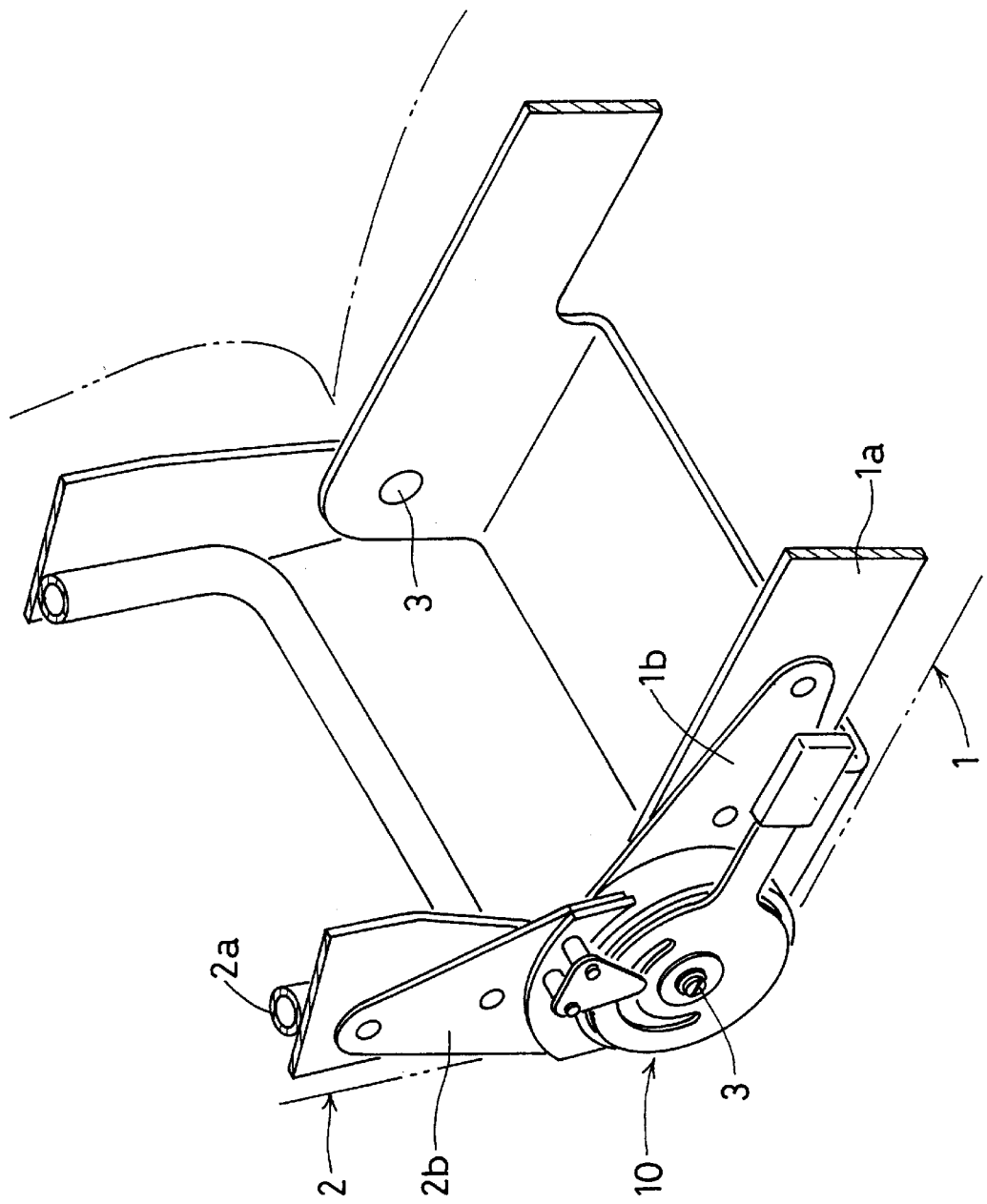
FIG. 2 is a perspective view of a coupling portion of the same.

As shown in FIG. 1, the reclining seat comprises a seat cushion 1, and a backrest 2 having its bottom coupled to the rear end of the seat cushion 1. As shown in FIG. 2, the seat cushion 1 has a frame 1*a* having brackets 1*b* mounted to the rear end thereof on both sides. The backrest 2 also has a frame 2*a* carrying brackets 2*b* at its bottom on both sides.

Each bracket 1*b* of the seat cushion 1 has a coupling shaft 3. The bracket 2*b* of the backrest 2 on one side is pivotably mounted on the shaft 3 on the same side.

A clutch 10 is mounted on the other shaft 3. As shown in FIGS. 3 through 6, the clutch 10 includes a fixed ring 11 and a rotary ring 12 mounted around the fixed ring. The fixed ring 11 is fixed to the bracket 1*b* of the seat cushion 1. On its outer surface, the fixed ring 11 has a small-diameter bearing surface 13 formed at one end.

At this end, the rotary ring 12 has at one end thereof an inwardly extending flange 12*a* rotatably supported on the bearing surface 13.

The rotary ring 12 has on its outer periphery a coupling piece 12*b* coupled to the bracket 2*b* of the backrest 2. The backrest is thus inclinable around the fixed ring 11, i.e. around the shaft 3 which is coaxial with the fixed ring 3.

A locking mechanism 20 is provided to prevent the fixed shaft 12 from pivoting in either direction.

The locking mechanism 20 comprises a plurality of cam grooves 21 formed in the circumferential surface of the fixed ring 11, a cylindrical inner surface 22 formed on the rotary ring 12, and rollers or rolling elements 23 each received in one of the can grooves 21, kept in frictional contact with the cam groove bottoms 21*a* and the cylindrical surface 22.

Figure 7A:
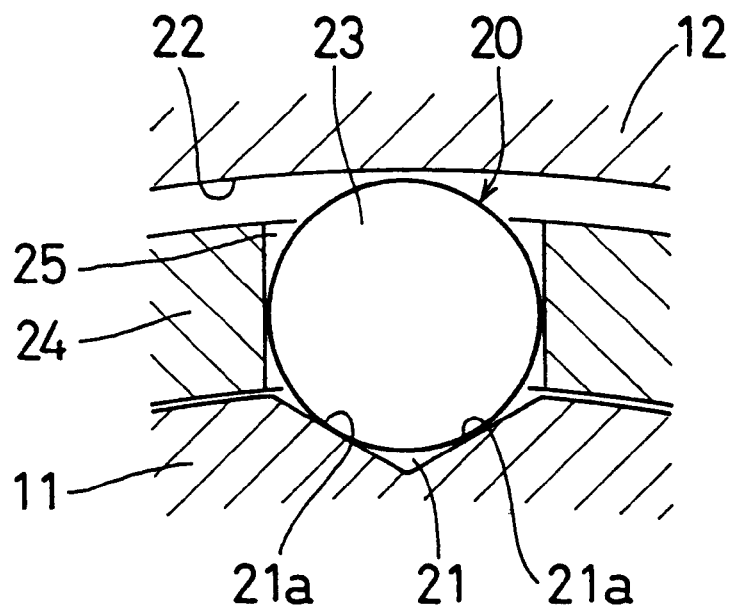
FIGS. 7A and 7B are sectional views of different cam grooves of locking mechanisms.
Figure 7B:
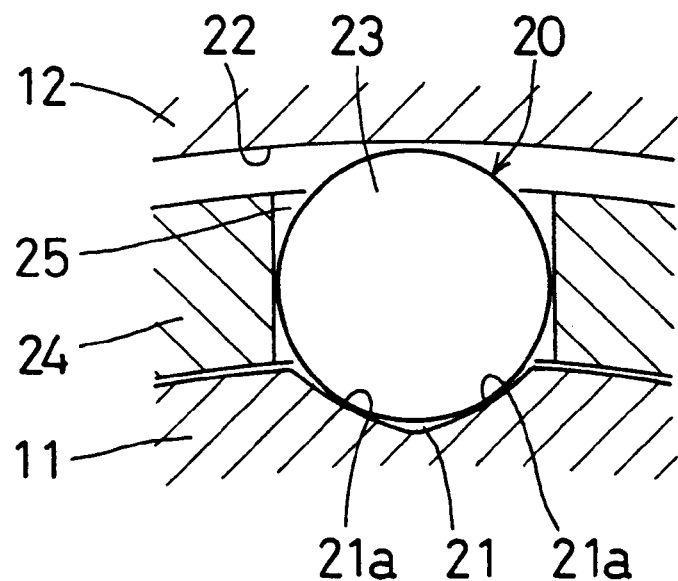

The cam grooves 21 are V-shaped when viewed along the axis of the ring 11. The groove bottoms 21*a* may be two opposed, inclined, flat surfaces as shown in FIG. 7A, or two opposed, inclined, arcuate surfaces as shown in FIG. 7B.

Figure 8A:
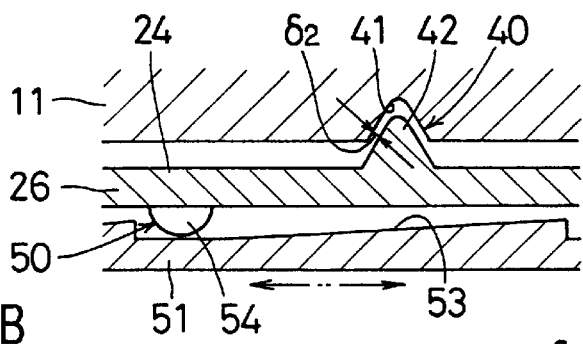
FIG. 8A is a sectional view of an unlocking mechanism in the clutch.
Figure 8B:
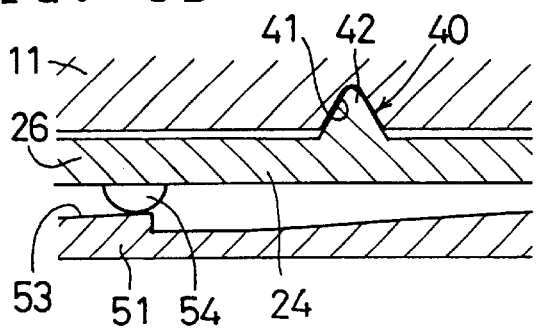
FIGS. 8B through 8G show the relationship between the unlocking mechanism and the locking mechanism.
Figure 8C:
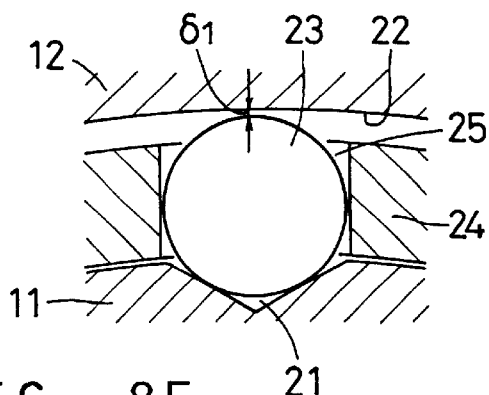
Figure 8D:
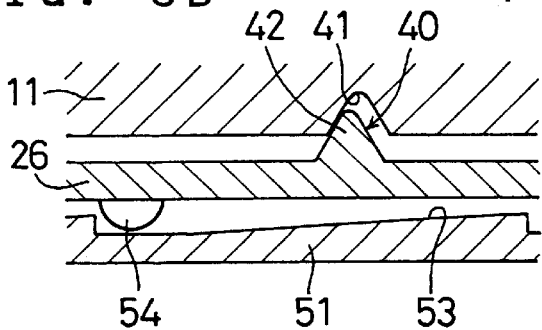
Figure 8E:
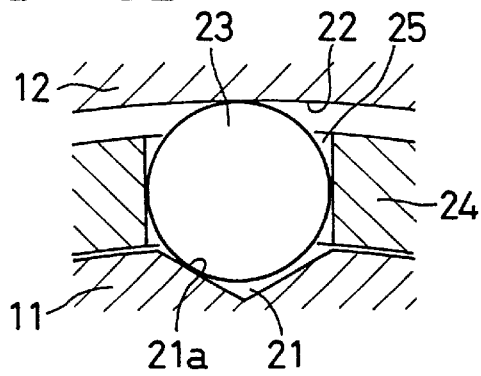
Figure 8F:
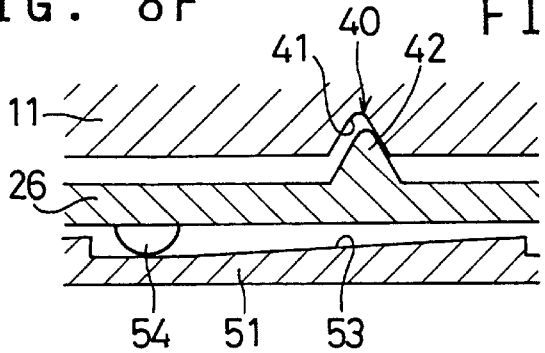
Figure 9A:
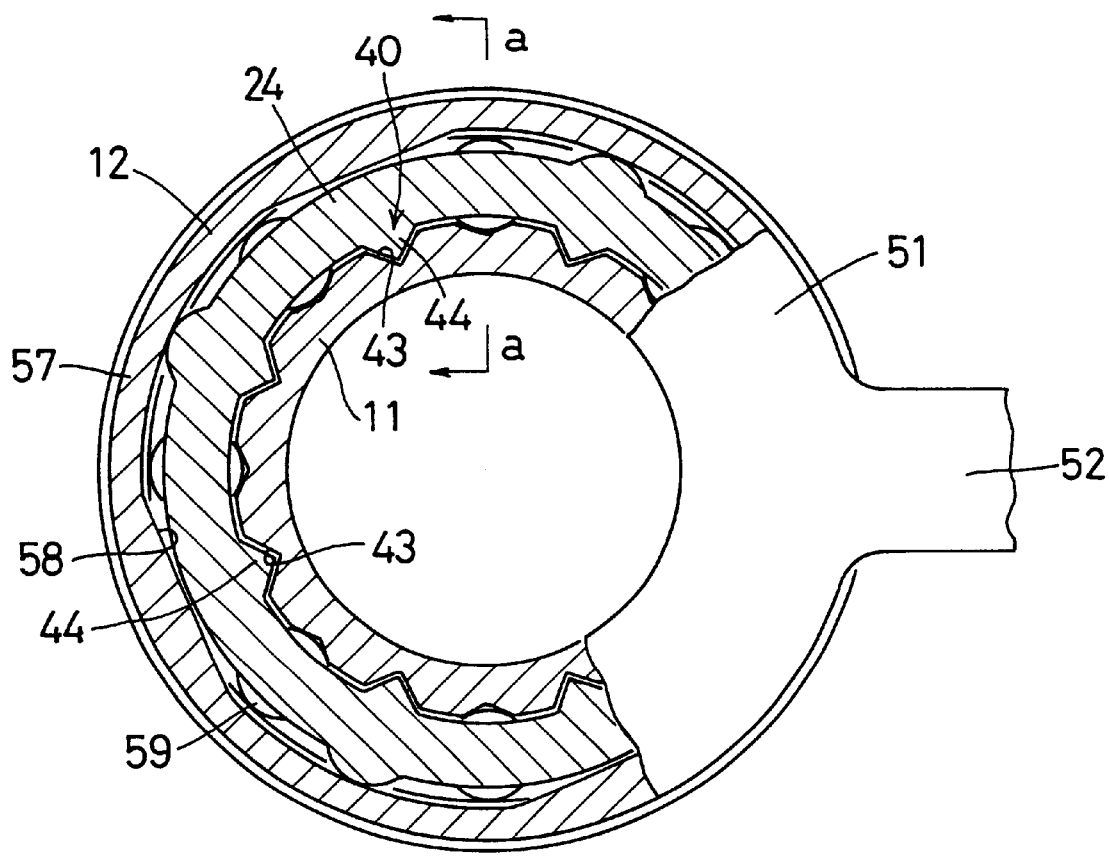
FIG. 9A is a partially cutaway front view of a different embodiment of the clutch.

As shown in FIG. 8C, the rolling elements 23 have such an outer diameter that a small radial gap δ 1 forms in a neutral position, i.e. at a circumferentially central position of each cam groove 21. When moved even slightly from this position, the rolling elements come into frictional contact with the cylindrical surface 22 and the groove bottom 21*a* as shown in FIGS. 8E and 9G.

Figure 4:
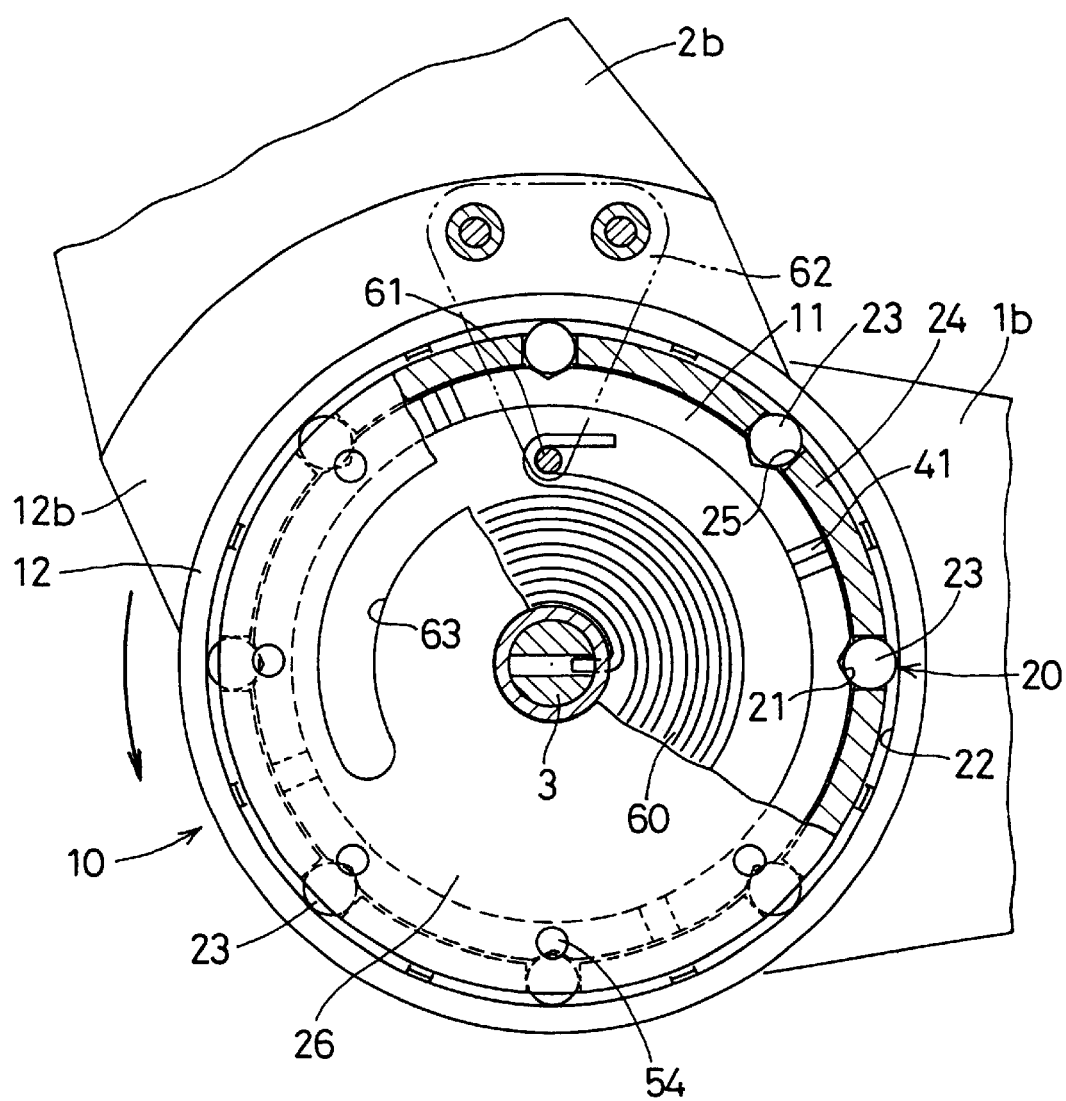
FIG. 4 is a front view in vertical section of the clutch.
Figure 5:
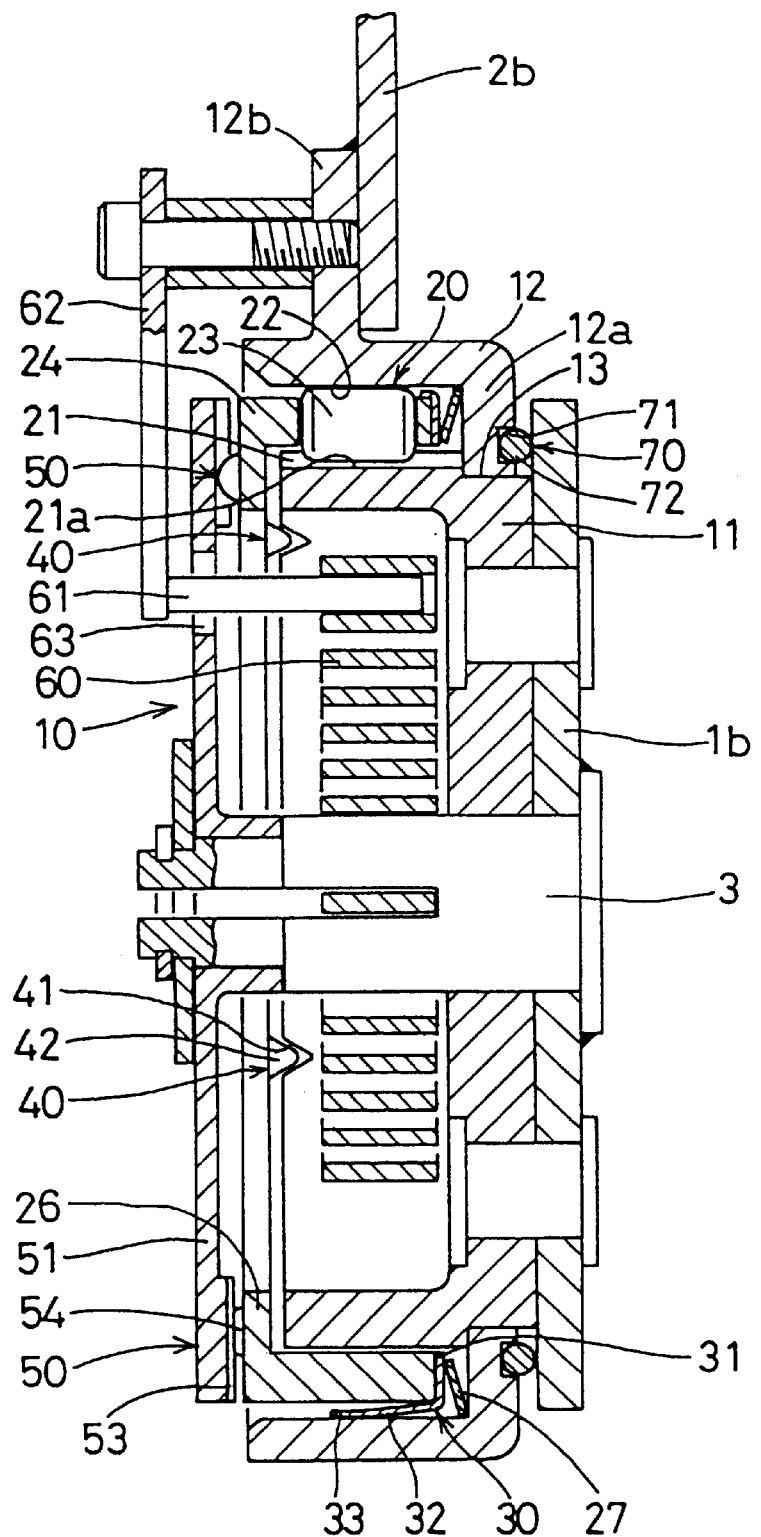
FIG. 5 is a sectional view taken along line V—V of FIG. 3.

As shown in FIGS. 4 and 5, the rolling elements 23 are retained by a cage 24 mounted between the fixed ring 11 and the rotary ring 12. The cage 24 is formed with pockets 25 in which the rolling elements 23 are received. The pockets 25 have such a width that the rolling elements 23 are received therein with a small or negative radial clearance present with respect to the rolling elements 23.

The cage 24 is guided by the outer peripheral surface of the fixed ring 11, and has a flange 26 on one side. The cage 24 elastically deforms an elastic member 27 mounted in the rotary ring 12 when the flange 26 is moving toward the fixed ring 11. The elastic member 27 thus elastically pushes the cage 24 back to the original position.

Figure 6:
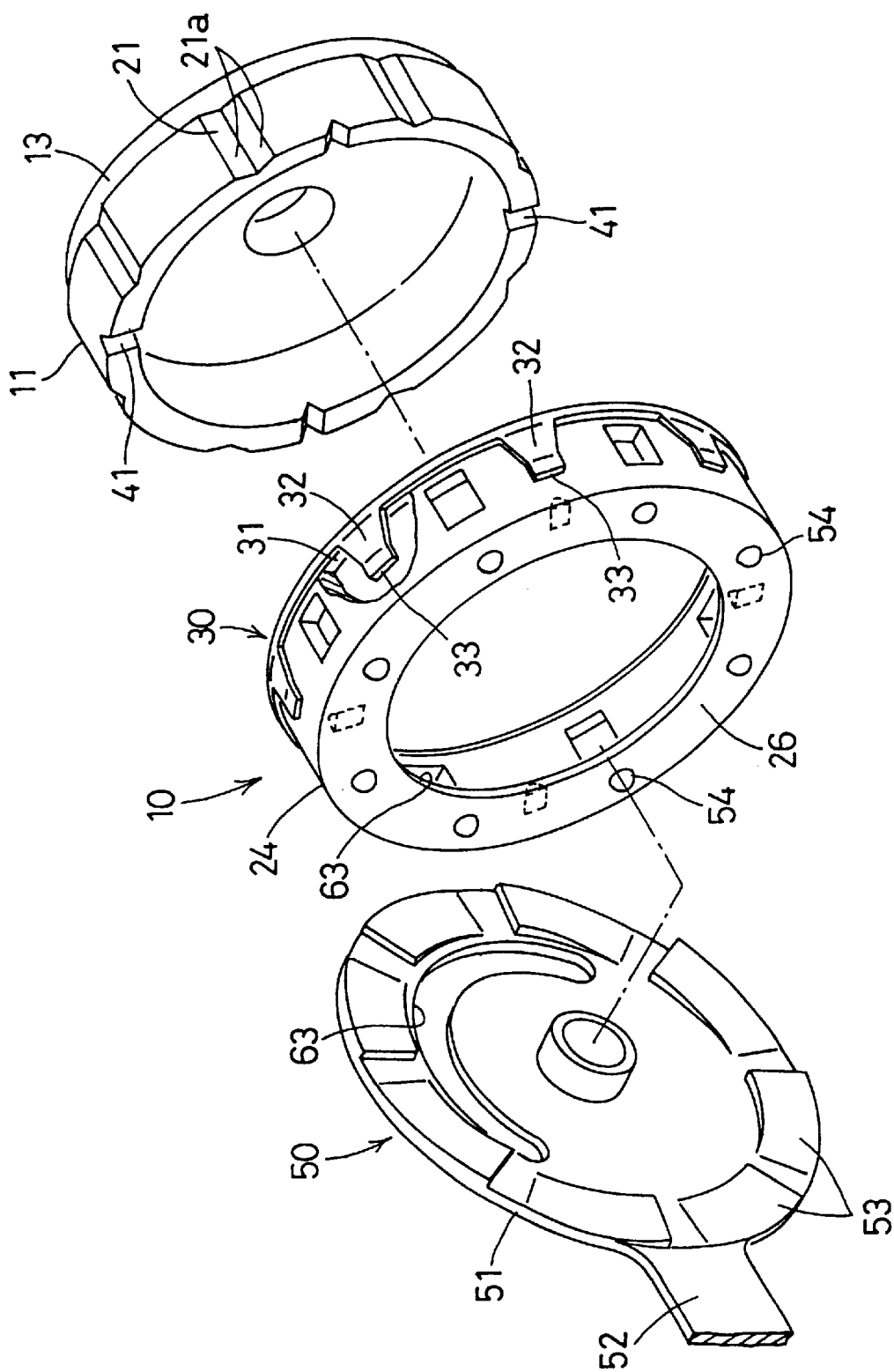
FIG. 6 is an exploded perspective view of a fixed ring, a cage and a control member.

As shown in FIGS. 5 and 6, provided between the cage 24 and the rotary ring 12 is a friction mechanism 30 through which the rotation of the rotary ring 12 is transmitted to the cage 24. The friction mechanism 30 comprises an annular plate 31 fixed to one end of the cage 24, a plurality of elastic pieces 32 formed on the outer peripheral surface of the annular plate 31 and each having a contact portion 33 at its tip adapted to be brought into elastic contact with the cylindrical surface 22 of the rotary ring 12.

The locking mechanism 20 is unlocked by an unlocking mechanism 40 which is controlled by a control mechanism 50.

The unlocking mechanism 40 comprises, as shown in FIGS. 5 and 8A, V-shaped positioning recesses 41 formed on the fixed ring 11 at one end thereof, and positioning protrusions 42 formed on the flange 26 of the cage 24 so as to be engageable in the recesses 41. When the cage 24 is moved axially, the protrusions 42 engage in the recesses 41 as shown in FIG. 8B, so that the cage 24 is positioned relative to the fixed ring 11. In this state, the rolling elements 23 are retained in the neutral position (FIG. 8C), in which they are at the circumferential central position of each cam groove 21.

As shown in FIGS. 5 and 6, the operating mechanism 50 comprises a control disk 51 rotatably mounted on the tip of the shaft 3 and having a lever 52 on its outer circumference. By rotating the disk 51 by gripping the lever 52, cams 53 formed on one side of the disk 51 press protrusions 54 on the surface of the flange 26 of the cage 24, thus axially moving the cage.

Figure 3:
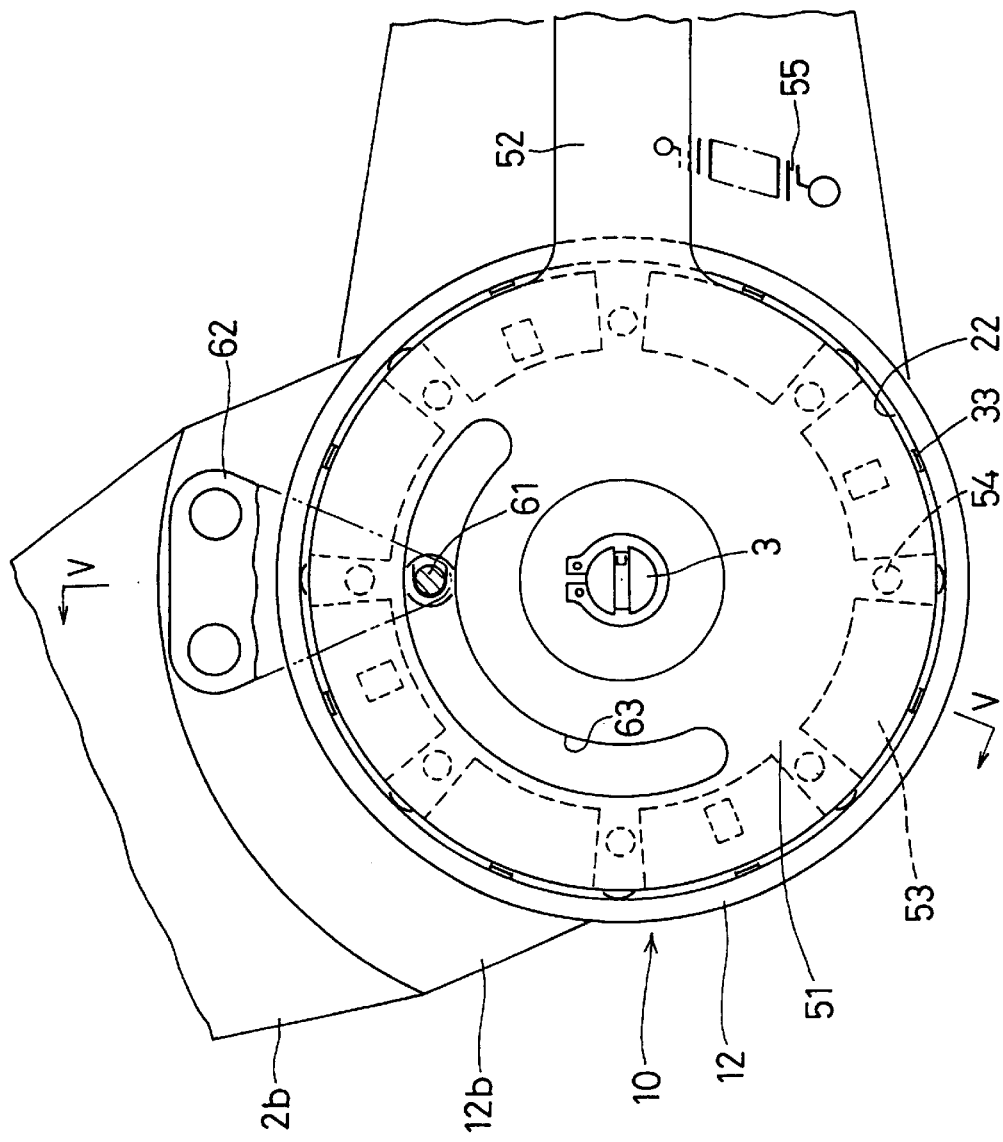
FIG. 3 is a front view of the clutch.

As shown in FIG. 1, the lever 52 is inserted in an elongate hole 15 formed in a clutch cover 14 covering the clutch 10 so as to be movable along the hole 15. As seen in FIG. 3, the lever 52 is urged by a resilient member 55 or tension coil spring to its original position.

As shown in FIG. 5, a spiral spring 60 is mounted in the fixed ring 11. It has its inner end coupled to the shaft 3 and the outer end hooked to a shaft 61 having at its end a mounting piece 62 fixed to the coupling piece 12b of the rotary ring 12. The backrest 2 is thus elastically urged by the spiral spring 60 toward its upright position.

The shaft 61 is inserted in an arcuate elongate hole 63 formed in the control disk 51 so as not to hinder the rotation of the disk 51.

A friction device 70 (FIG. 5) for applying frictional resistance to the rotary shaft 12 is provided between the rotary ring 12 and the bracket 2b of the backrest 2.

As shown in FIG. 5, the friction device 70 comprises an annular groove 71 formed in the flange 12a of the rotary ring 12, and an elastic ring 72 received in the annular groove 71 and elastically pressed against the bracket 1b to apply a frictional resistance to the rotary ring 12, thereby absorbing any shaky motion of the rotary ring 12 in the direction of rotation.

FIG. 1 shows the reclining seat of the embodiment when the lever 52 has been pushed down by the elastic member 55 to its neutral (original) position. In this state, as shown in FIG. 8A, clearances δ 2 in the rotating direction are present between the protrusions 42 and the recesses 41 of the unlocking mechanism 40, so that the cage 24 is pivotable by a distance permitted by the clearance relative to the fixed ring 11.

The spiral spring 60 urges the backrest 2 toward its upright position, and thus presses the rolling elements 23 of the locking mechanism 20 into frictional contact with the bottoms 21a of the cam grooves 21 and the cylindrical surface 22 (FIG. 8G), thereby locking the backrest 2 from pivoting toward its upright position.

In this state, when a person leans against the backrest 2, the rotary ring 12 is turned in the direction of the arrow in FIG. 4, and the cage 24 is given a turning force in the same direction through the friction mechanism 30.

Figure 8G:
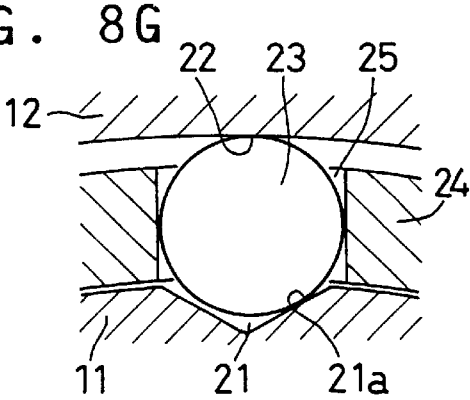

Due to small clearances in the rotating direction present between the cam grooves 21 and the rolling elements 23, the backrest 2 inclines by an angle permitted by the clearances, and a moment later, from the state of FIG. 8G to that of FIG. 8E, the rolling elements 23 come into frictional contact with the bottoms 21 a of the cam grooves 21 and the cylindrical surface 22 of the rotary ring 12, locking the backrest 2 again.

When the backrest 2 is inclined rearwardly by an angle permitted by the clearances between the cam grooves 21 and the rolling elements 23, the rotary ring 12 turns while kept in contact with the elastic ring 72 shown in FIG. 5, so that the ring 72 absorbs any shaky movement of the backrest 2 in the rotating direction that might be otherwise felt by the driver.

Silicon oil of $10^5$ cSt or over may be applied to the contact portion between the elastic ring 72 and the rotary ring 12 to further smoothen the movement of the rotary ring 12 and more effectively absorb shaky motion of the backrest 2 in the rotating direction.

In order to adjust the inclination angle of the backrest 2, the lever 52 shown in FIG. 1 is raised. When it is raised, the protrusions 54 of the cage 24 are urged by the cams 53 of the disk 51, so that the cage 24 is axially moved until the protrusions 42 engage in the recesses 41 as shown in FIG. 8B. The cage 24 is thus positioned relative to the fixed ring 11, and as shown in FIG. 8C, the rolling elements 23 are held in the neutral position at which they are in the circumferential center of each cam groove 21. The locking mechanism 20 is thus unlocked.

In the unlocked state, radial clearances 61 are formed between the rolling elements 23 and the cylindrical surface 22, so that the backrest 2 is now inclinable in either direction. Thus, when a person leans against the backrest 2 in this state, the backrest is inclinable rearwardly. When he raises his body, the backrest 2 will also be raised by the force of the spiral spring 60. Thus, a person can adjust the backrest 2 to a desired angle.

When the user releases the lever 52 after adjusting the angle of the backrest 2, the lever will return to the neutral position under the force of the elastic member 55, so that the cage 24 is moved back toward the disk 51 by the elastic member 27 mounted in the rotary ring 12. Thus, as shown in FIG. 8A, the protrusions 42 of the unlocking mechanism 40 disengage from the recesses 41, and as shown in FIG. 8E or 8G, the rolling elements 23 of the locking mechanism 20 will move into frictional contact with the bottoms 21a of the cam grooves 21 and the cylindrical surface 22. The backrest 2 is thus locked in position again.

The backrest 2 can thus be locked in position at any desired angle at which a driver is the least fatigued and can control the steering wheel most comfortably and reliably.

Since the locking mechanism is a friction contact type, it is possible to incline the backrest without producing any uncomfortable noise.

Figure 9B:
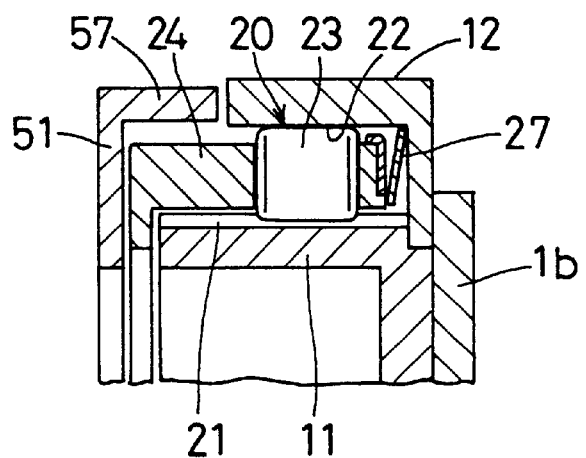
FIG. 9B is a sectional view along line a—a of FIG. 9A.

FIG. 9 shows a modified embodiment. The clutch of this embodiment has a cage 24 made of a resiliently deformable material. An unlocking mechanism 40 is provided between the inner peripheral surface of the cage 24 and the outer peripheral surface of the fixed ring 11.

The unlocking mechanism 40 comprises positioning recesses 43 formed in the outer peripheral surface of the fixed ring 11, and positioning protrusions 44 formed on the inner peripheral surface of the cage 24.

The control disk 51 has on its outer circumference a cylindrical portion 57 which fits on an end of the cage 24 and has cam surfaces 58 on its inner peripheral surface. On the outer peripheral surface of the cage 24, protrusions 59 are formed which are radially biased by the cam surfaces 58.

Otherwise, this clutch is structurally the same as the clutch 10 of the first embodiment. Like parts are therefore denoted by like references and not described in detail.

Figure 10A:
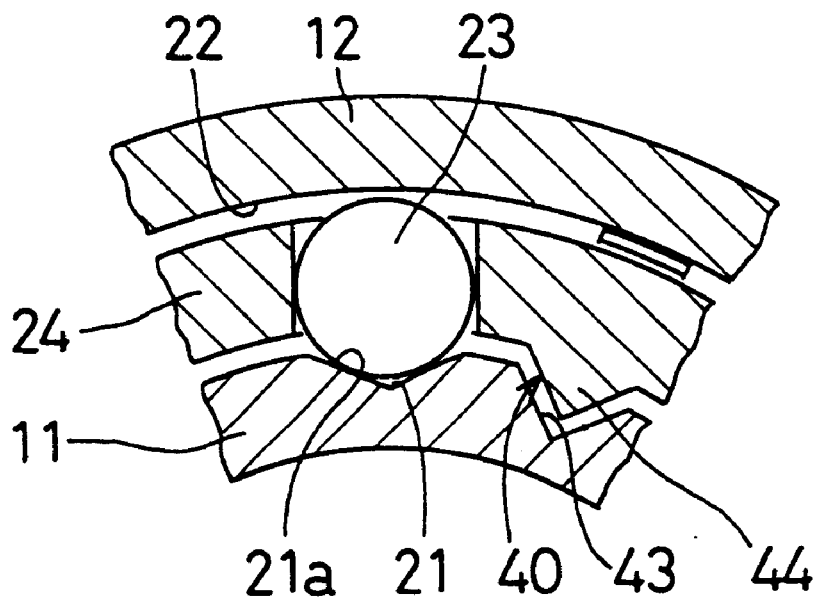
FIGS. 10A and 10B are sectional views showing the relationship between the locking and unlocking of the clutch of FIG. 9A.
Figure 10B:
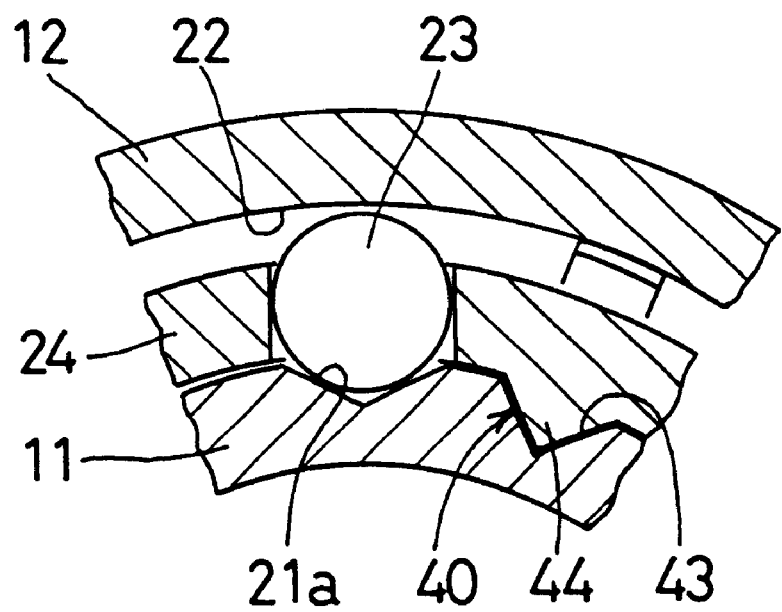

When the user raises the lever 52, the cylindrical portion 57 turns, the protrusions 59 on the outer peripheral surface of the cage are pressed by the cam surfaces 58, and the cage 24 is resiliently deformed radially, so that as shown in FIG. 10B, the protrusions 44 engage in the recesses 43, thus positioning the cage 24 with the rolling elements 23 held in the neutral position in the cam grooves 21.

FIG. 11 shows another embodiment in which instead of the rolling elements 23 in the cam grooves 21, sprags 80 are used. The sprags have a substantially T-shaped section, and have their base portions pivotably inserted in arcuate cutouts 81 formed in the outer peripheral surface of the fixed ring 11.

The cage 24 has pockets 82 in which are received the legs of the sprags 80.

Otherwise, this clutch is structurally the same as the clutch 10 of FIG. 5. Like parts are therefore denoted by like numerals and not described again.

Figure 11A:
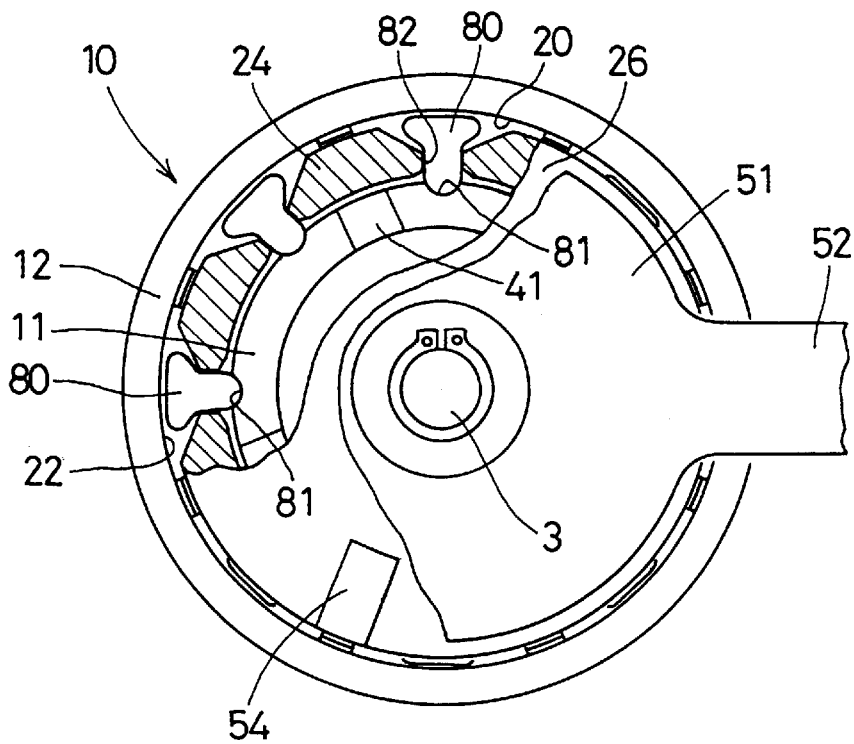
FIG. 11A is a partially cutaway front view of a still different embodiment of the clutch.
Figure 11B:
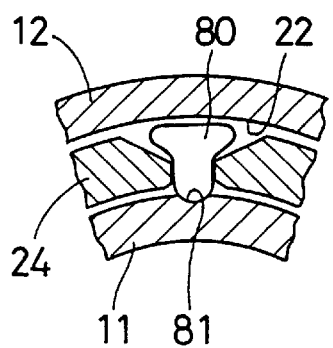
FIGS. 11B through 11D are views showing how the embodiment of FIG. 11A operates.
Figure 11C:
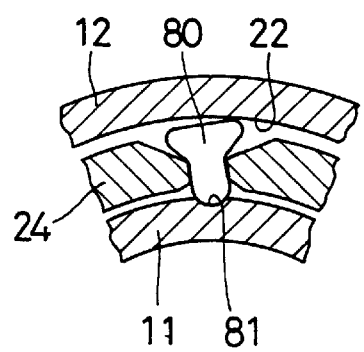
Figure 11D:
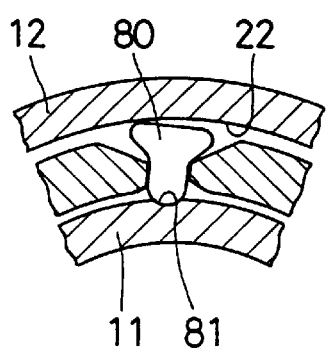

When the rotary ring 12 is rotated, the cage 24 rotates together, so that the sprags 80 pivot in the cutouts 81 and come into frictional contact with the cylindrical surface as shown in FIGS. 11C or 1D. The rotary ring 12 is thus locked.

Figure 12:
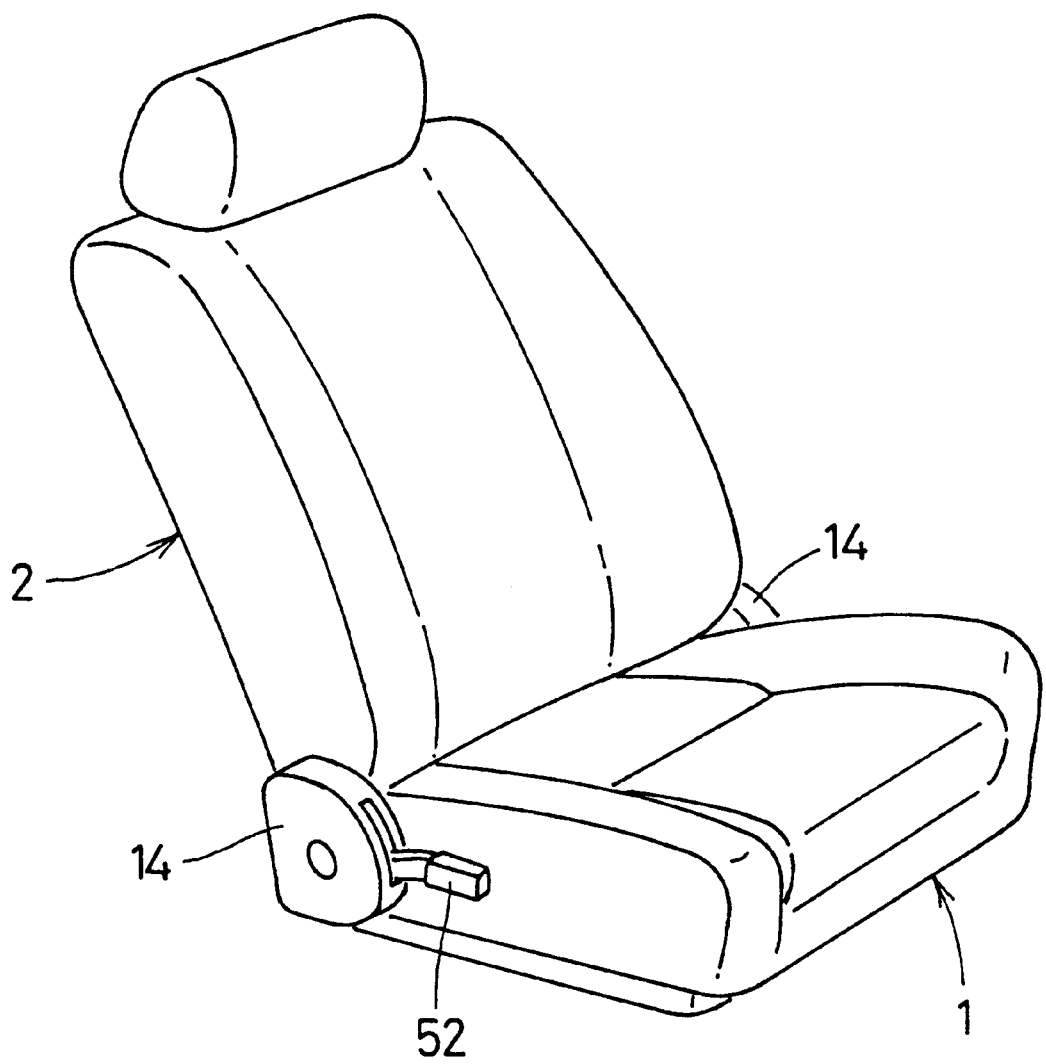
FIG. 12 is a perspective view of a reclining seat of another embodiment.
Figure 13:
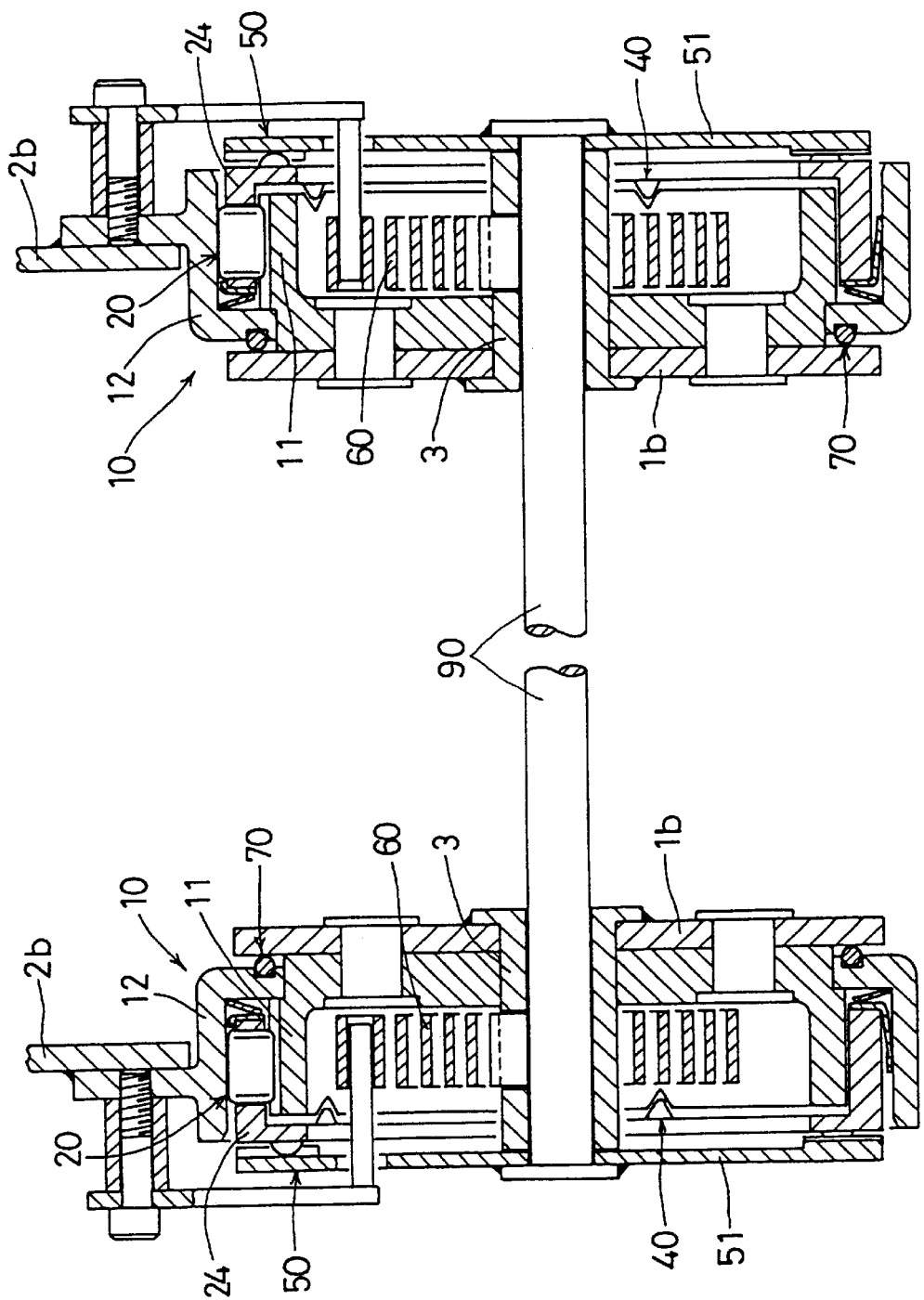
FIG. 13 is a sectional view showing the relation between two clutches of the embodiment of FIG. 12.

FIGS. 12 and 13 show another embodiment in which clutches 10 are provided on both sides of the coupling portion of the seat cushion 1 and the backrest 2. Each clutch 10 is covered by a clutch cover 14.

As shown in FIG. 13, the clutches 10 are supported on tubular shafts 3 into which is inserted a shaft 90 having one end thereof coupled to a control disk 51 of one clutch 10 and the other end coupled to that of the other clutch 10 to couple the clutches 10 together. Only the control disk 51 of one of the clutches 10 has a lever 52.

This embodiment is otherwise structurally the same as the embodiment of FIG. 5, and like elements are denoted by like numerals and their description is not repeated.

By providing a pair of clutches at both sides, it is possible to support the backrest 2 more stably, and, even if a large load acts on the backrest, absorb it, thereby preventing the backrest from being twisted.

According to this invention, the backrest can be locked in position at any desired angle. This keeps the driver the least fatigued and enables him to control the steering wheel most comfortably.

The frictional contact type locking mechanism makes it possible to incline the backrest without producing any uncomfortable noise.

What is claimed is:

1. A reclining seat comprising a seat cushion, a backrest inclinably coupled to said seat cushion, an elastic member for biasing said backrest toward an upright position, a clutch provided on an axis about which said backrest pivots, said clutch comprising a fixed ring mounted to said seat cushion, a rotary ring mounted to said backrest, a locking mechanism for frictionally locking said rotary ring from turning relative to said fixed ring by coming into frictional contact with said rotary ring, an unlocking mechanism for unlocking said rotary ring, and an operating device for operating said unlocking mechanism.

2. The seat claimed in claim 1 wherein said clutch comprises a first clutch provided on one of opposite sides of a coupling portion where said seat cushion and said backrest are coupled together, wherein a second clutch is provided on the other of the opposite sides of the coupling portion, and wherein said first and second clutches are operatively coupled together.

3. The seat claimed in claim 1 further comprising a friction mechanism for applying a frictional resistance to said rotary ring.

4. The seat claimed in claim 1 wherein said elastic member comprises a spiral spring mounted in a smaller-diameter one of said fixed ring and said rotary ring.

5. The seat claimed in claim 1 wherein said locking mechanism comprises arcuate cutouts formed on a small-diameter one of the opposed circumferential surfaces of said fixed ring and said rotary ring, sprags each circumferentially pivotable, about one of said cutouts and adapted to come into frictional contact with a large-diameter one of the opposed circumferential surfaces when pivoted, a cage for retaining said sprags, and a friction mechanism provided between said cage and said rotary ring for transmitting the rotation of said rotary ring to said cage.

6. The seat claimed in claim 5 wherein said unlocking mechanism comprises positioning recesses formed in one of opposed surfaces between said cage and said fixed ring, and positioning protrusions formed on the other of said opposed surfaces and each received in one of said positioning recesses with a clearance present in the rotating direction, said positioning protrusions being movable to engaged positions wherein said clearances disappear to position said cage relative to said fixed ring, thereby keeping said rolling elements in neutral positions at circumferential centers of said cam grooves.

7. The seat claimed in claim 1 wherein said locking mechanism comprises cam grooves formed in said fixed ring on a circumferential surface thereof and which are deepest at circumferentially central portions thereof and gradually shallower toward both circumferential ends, a cylindrical surface formed on said rotary ring opposite said fixed ring, rolling elements received in said cam grooves such that when said rolling elements are in neutral positions at the circumferential centers of said cam grooves, respectively, small radial gaps are present between said rolling elements and said cam grooves, a cage mounted between said fixed ring and said rotary ring for retaining said rolling elements, and a friction mechanism provided between said cage and said rotary ring for transmitting the rotation of said rotary ring to said cage.

8. The seat claimed in claim 7 wherein said unlocking mechanism comprises positioning recesses formed in one of opposed surfaces between said cage and said fixed ring, and positioning protrusions formed on the other of said opposed surfaces and each received in one of said positioning recesses with a clearance present in the rotating direction, said positioning protrusions being movable to engaged positions wherein said clearances disappear to position said cage relative to said fixed ring, thereby keeping said rolling elements in said neutral positions.

9. The seat claimed in claim 8 wherein said operating mechanism comprises a control member having a lever and provided axially opposite said cage so as to be rotatable relative to said cage, and a cam device between said control member and said cage for pressing said cage when the control member rotates, thereby engaging said positioning protrusions in said positioning recesses.

10. The seat claimed in claim 8 wherein said cage has a flange provided axially opposite said fixed ring, and wherein positioning recesses are formed in one of opposed surfaces of said flange and said fixed ring, and positioning protrusions are formed on the other of the opposed surfaces of said flange and said fixed ring.

11. The seat claimed in claim 10 wherein said operating device comprises a control member having a lever and provided axially opposite said cage so as to be rotatable relative to said cage, and a cam device between said control member and said cage for pressing said cage when the control member rotates, thereby engaging said positioning protrusions in said positioning recesses.

12. The seat claimed in claim 8 wherein said cage is made from a resiliently deformable material, and wherein positioning recesses are formed in one of opposed surfaces of said cage and said fixed ring, and positioning protrusions are formed on the other of the opposed surfaces of said cage and said fixed ring.

13. The seat claimed in claim 12 wherein said operating device comprises a control member having a lever and provided axially opposite said cage so as to be rotatable relative to said cage, and a cam device between said control member and said cage for pressing said cage when the control member rotates, thereby engaging said positioning protrusions in said positioning recesses.

* * * * *